Patented Apr. 1, 1930

1,753,184

UNITED STATES PATENT OFFICE

DAVID SPENCE, OF NORWALK, CONNECTICUT, ASSIGNOR TO INTERCONTINENTAL RUBBER COMPANY, OF NEW YORK, N. Y., A CORPORATION OF DELAWARE

TREATMENT OF GUAYULE, ETC.

No Drawing. Application filed May 8, 1926. Serial No. 107,830.

This invention relates to improvements in the treatment of rubber-bearing plants and shrubs and particularly to the treatment of guayule plants or shrubs, and includes improvements both in methods or treatment and in the treated products.

While the invention is applicable to various rubber producing plants, shrubs and vines which abound in different parts of the world, it is of special advantage in its application to the guayule shrub, and it will be more particularly described in connection therewith.

The shrub commonly known as the guayule shrub abounds in northern Mexico and to some extent in the United States. The plant is harvested and treated for the extraction of rubber therefrom. The plants are harvested by cutting or by pulling up by the roots and are then usually left in the sun for a period of time sufficient to dry or cure them and to give what is known as prime shrubs. After curing, the shrub is usually baled and forwarded in that form to the factory for extraction.

The period of time which elapses between harvesting of the shrub and extraction of rubber therefrom varies greatly, depending upon a number of factors, some beyond control, such as transportation facilities, accessibility of the ranch or place of growth to the extraction mill, climatic conditions affetcing the harvesting of the shrub, accumulation of harvested shrub awaiting extraction, etc. In order to insure a continuous supply of shrub for extraction it may be necessary to store the shrubs for varying periods of time before extraction.

It is well known that the rubber in the guayule plants, even where the plants are properly harvested and in prime condition, undergoes deterioration which is progressive in character, particularly if the harvested shrubs are kept for any considerable time before extraction. If the shrubs are harvested during the season when they are best suited for extraction they accumulate to such an extent that a considerable time may elapse before milling, with resulting objectionable deterioration of the rubber content. If the shrub is kept for any considerable time before extraction an inferior quality of rubber is obtained, the rubber being soft and sticky and the yields low. In order to avoid such an accumulation of shrub and accompanying deterioration, resort is had to the unseasonable harvesting of the shrub, when the shrub may be more difficult to extract or when greater danger of deterioration may exist.

These difficulties and objections are well recognized and the present day commercial harvesting of guayule and extraction of rubber therefrom results in an enormous loss in yield or rubber extracted, due to deterioration, as well as the production of a product much of which is of inferior quality. Furthermore, the rubber produced is itself liable to deteriorate, after its extraction and during its storage and shipment and before it is used. In so far as I am aware no means has heretofore been known for overcoming these objections and difficulties.

The present invention provides an improved method of treatment of the guayule shrub after harvesting, whereby deterioration of its rubber contact is avoided or minimized and whereby the harvested shrub is stabilized and preserved so that it can be kept for comparatively long periods of time before extraction without the objectionable deterioration of the rubber content which has heretofore commonly occurred. The present invention makes possible the harvesting of the shrub during the harvesting seasons and the storage of the harvested shrub in sufficient quantity and for sufficiently prolonged periods of time to enable the extraction mill to operate both during the harvesting seasons and during other seasons which are unfavorable for harvesting, while nevertheless permitting recovery of a high yield of high-grade rubber from the preserved shrub.

According to the present invention I treat the harvested guayule shrub with a preservative or stabilizing agent which will stabilize or preserve the shrub and particularly the rubber content thereof against objectionable deterioration. As such a stabilizing or preservative agent I use a material which prevents the physical degeneration of the rubber, which is sometimes referred to as depolymerization. Among such stabilizing or degeneration-preventing agents may be mentioned organic nitrogenous bases and particularly certain amines and derivatives of amines. A particularly suitable agent is dimethyl-para-phenylenediamine and I will refer more particularly to the use of this agent in the further description of the invention, although other agents may be used.

The deterioration of the rubber which occurs in the shrub after harvesting and before extraction has been considered to be due to oxidation, and it may be that oxidation plays some part in such deterioration. My investigations, however, have led me to consider this deterioration a depolymerization without any appreciable or considerable oxidation of the rubber. Whatever the explanation may be of the degeneration of the rubber in the shrub, I have found that it can be effectively prevented or reduced by treating the shrub in accordance with the present invention.

In carrying out the improved process of the present invention I subject the harvested shrub to the action of the stabilizing or preservative agent or agents and cause the same to be absorbed by the rubber in the shrub, thereby stabilizing the rubber in the shrub so that it resists deterioration.

The treatment of the harvested shrub can be effected shortly after harvesting and while the shrub is in prime condition but before it is crushed or ground; or the shrub may be subjected to a crushing operation and treated with the agent during such operation or subsequent thereto to give a stabilized crushed shrub, which can then be kept for prolonged periods of time before the extraction of the rubber therefrom.

When the shrub is treated before crushing it may be treated by spraying it or by immersing it in a solution of the stabilizing agent or the stabilizing agent may be brought into contact therewith in vapor form or in some other way. The baled shrub in the form in which it is baled for shipment may be treated, for example, by immersing the bale in a solution of the stabilizing agent for a sufficient time to permit the agent to act upon the shrub and penetrate the same to the necessary extent, or by subjecting the baled shrub to an atmosphere containing vapors of the agent, or to a mist or spray of a solution of the agent or containing the agent, e. g. an aqueous solution of the agent in the form of a mist or spray, or a humidified atmosphere containing the agent, etc. It will be evident that the time required for immersion or other treatment will vary with shrubs of different sizes and with the condition of the shrub as well as the temperature of the solution and the nature and amount of stabilizing material therein, etc.

In treating the bales they may be immersed in an ordinary tank containing a solution of the stabilizing material and permitted to soak therein for a sufficient time or the impregnating treatment may be promoted by heating the solution or by carrying it out in a closed vessel connected with vacuum and pressure producing means, whereby the material may be first subjected to a vacuum to remove air and gases and to facilitate penetration by the solution; or pressure may also be used to aid in forcing the solution into the shrub. A solution containing 1% of dimethyl-para-phenylenediamine can be used and the same solution can be used over and over again for treating successive bales or amounts of the shrub with replenishment of the amount of the treating material from time to time as required.

After treating the shrub with a solution it can be dried either by exposure to the air where atmospheric conditions are suitable, or by subjecting it to an artificial drying operation; or the treated shrub can be stored with only partial drying and with regulation of the moisture content to avoid undue drying out of the shrub, as where the treatment takes place at the factory where the treated material is stored in a warehouse under regulated conditions of humidity; or the shrub can be stored in an atmosphere containing the stabilizing agent or agents and the treatment effected in part or in whole during such storage.

The treated shrub, for example, in the form of bales can be kept for relatively prolonged periods of time without the usual objectionable deterioration incident to such storage. The treatment can be carried out at the ranch or at the place where the shrub is collected and baled and the treated shrub can be stored in warehouses either at the place of treatment or at the extraction factory or at other convenient place of storage. The preservation of the shrub, for example, in the form of bales, enables the usual deterioration incident to transportation and storage of the baled guayule to be avoided or minimized.

Instead of treating the shrub before subjecting it to crushing or grinding, it may advantageously be subjected to a crushing or grinding such as that to which it is commonly subjected prior to extraction and the crushed material can then be treated with the stabilizing or preservative agent or agents. This treatment may take place during the crushing of the shrub or subsequent thereto. A solution of the stabilizing or preservative agent may be added to the shrub while it is being passed through the crusher rolls or the crushed shrub, crushed on the crusher rolls, may then be treated with the solution. This treatment may be carried out in various ways. The crushed material may be, for example, passed to a tank or other container containing a solution of the stabilizing or preservative agent and immersed therein for a sufficient period of time, using for example, a solution of dimethyl-para-phenylenediamine, the strength and amount of which may vary with the amount of crushed shrub which it is required to treat. Two or more tanks or containers may be provided for the treatment of successive batches of accumulated ground shrub, so that the shrub can be treated for a sufficient period of time. So also, the treatment can be carried out in a continuous manner, for example, by discharging the crushed shrub continuously into a treating solution in which it is immersed for a sufficient period of time and from which it is withdrawn after treatment. In either the batch or continuous method of treatment the amount of stabilizing or preservative agent can be regulated and controlled and replenished as required to maintain a solution of suitable strength and amount. A 1% solution of dimethyl-para-phenylenediamine is suitable for this purpose, but a stronger or more dilute solution can be used and the time of treatment can be varied to give the required or desired treatment. When the solution has been impoverished by the absorption of the stabilizing or preservative agent by the shrub, the impoverished solution may be used to make up fresh solution by the addition of further amounts of the agent thereto and this replenished solution can be supplied either continuously or intermittently to the process. By continuously supplying solution in regulated amount to the crushed shrub after it is discharged continuously from the crusher and by maintaining the crushed shrub immersed in the solution for a regulated period of time, the treatment can be made continuous and a continuous supply of the treated material obtained.

After the treatment of the crushed shrub it can be dried to the desired extent or merely drained and preserved in a more or less moist condition. If the treated shrub dries out too much it may be more difficult to extract the rubber from it subsequently, but the preserved shrub can be kept more or less moist so that the subsequent extraction is facilitated without objectionable deterioration of the rubber in the shrub.

The treated shrub can be placed in storage in suitable warehouses or in containers similar to silos, or it can be baled and shipped in crushed form or stored in the form of bales.

The treatment of the guayule shrub either before or after crushing results in a new and improved guayule product, namely, a preserved and stabilized guayule shrub which can be kept without the usual rapid deterioration of the rubber content thereof. One form of this new and improved product is the treated shrub before crushing, as exemplified by the treated baled shrub which can be kept and shipped in bale form. Another form is the crushed shrub which is preserved in a crushed condition and can be stored or shipped in that condition.

The preservation of the shrub itself so as to prevent or reduce the objectionable deterioration of the rubber content makes the extraction mill more or less independent in that it can store its accumulated supply or receive its supply from an accumulated store of preserved material without the objections incident to the usual deterioration in storage. The shrub accordingly can be harvested during the season when it is best suited for milling and the harvest can be preserved for a greater or less period of time and the extraction mill can operate more or less independently of the harvesting season. The extraction mill moreover can accumulate its supply or store its supply near the locality where it is harvested, thus greatly prolonging the period when the extraction mill can operate on shrubs which are undeteriorated.

The invention is not limited to the treatment of fresh shrubs, but is also applicable to shrubs which have been kept for varying periods of time and in which some deterioration of the rubber content may have taken place. The treatment of such shrubs not only prevents or minimizes further deterioration, but may even cause improvement in the deteriorated rubber with resulting increase in yield as well as in quality of rubber subsequently extracted.

While the improved keeping qualities of the stabilized or preserved shrub may be due in part to the action of the preservative agent upon other constituents than rubber, I believe their action to be due primarily to absorption of the preservative agent by the rubber so that the rubber is itself stabilized by the absorbed stabilizing agent. When the shrub is treated with a solution of dimethyl-para-phenylenediamine, the treated shrub is darker in color. This substance, moreover, is readily absorbed by the rubber of the shrub and the rubber is characterized by its content of the material thus absorbed or by some reaction product thereof. The darkening in color of the treated shrub is apparently due to some reaction product of the dimethyl-para-phenylenediamine.

The preserved product of the present invention may, as hereinbefore stated, be preserved and stored with a moisture content corresponding to that of prime shrub, or with a regulated higher or lower moisture content, as by storing the preserved shrub in an atmosphere of regulated humidity. In such case, the preserved shrub will be maintained in a condition favorable for subsequent extraction and can be directly subjected to extraction without the necessity of soaking the shrub or the objections incident to the milling of too dry shrub. If the harvested shrub before treating has been dried until it is too dry for milling, it will be converted into a more or less moist shrub by the treating operation.

The improved process of the present invention presents the further advantage that the rubber extracted from the preserved shrub is of improved quality. The extraction can be carried out mechanically, by grinding the preserved shrub, after preliminary crushing, if necessary, in pebble mills in accordance with mechanical processes such as are now commonly used for the extraction of rubber from the guayule plant. The preserved shrub can also be treated with solvents for the rubber and the extraction thereby effected.

I do not claim herein the extraction of the rubber from the preserved shrub, inasmuch as this forms the subject of a separate application, Serial No. 108,700, filed May 12, 1926.

The treatment of the shrub with such agents as dimethyl-para-phenylenediamine is advantageous not only for the preservation of the shrub prior to extraction, but also in the extraction process. The process of the present invention, however, is particularly advantageous for the preservation of the shrub itself to enable it to be accumulated and stored without the usual objectionable deterioration. When the treated rubber is thus stored, the process of the invention includes not only the treatment of the shrub with the preservative agent, but also the subsequent storage of the thus treated shrub.

In the preceding description I have mentioned dimethyl-para-phenylenediamine as a suitable stabilizing or preservative agent, and this is an advantageous agent to use as such a preservative or degeneration-preventing agent. It is an amine and more particularly it is an aromatic diamine. It is soluble in water to a sufficient extent to enable it to be used in water solution, and it is also soluble in or absorbed by the rubber. It is an organic nitrogenous base, and its presence, even in small amount, in the rubber extracted from the preserved shrub imparts improved properties, including improved vulcanizing properties, to the extracted rubber. I do not limit myself however to the use of this agent, as other organic nitrogenous bases can be used in a similar way, for example, para-phenylenediamine, and particularly agents which are soluble in or absorbed by the rubber.

Among other organic nitrogenous substances may be mentioned other organic amines or bases of both the aromatic, aliphatic and heterocyclic series and certain derivatives thereof, for example, piperidine and other amines, condensation products of amines with aldehydes, etc.

I claim:

1. The method of treating guayule or other rubber-bearing plants, etc., which comprises subjecting the same after harvesting and before treatment for the extraction of rubber therefrom to the action of a stabilizing agent which will prevent the deterioration of the rubber in the plants.

2. The method of treating guayule or other rubber-bearing plants, etc., which comprises subjecting the same after harvesting and before treatment for the extraction of rubber therefrom to the action of an organic stabilizing agent which will prevent the deterioration of the rubber in the plants.

3. The method of treating guayule or other rubber-bearing plants, etc., which comprises subjecting the same after harvesting and before treatment for the extraction of rubber therefrom to the action of an organic nitrogenous stabilizing agent which will prevent the deterioration of the rubber in the plants.

4. The method of treating guayule or other rubber-bearing plants, etc., which comprises subjecting the same after harvesting and before treatment for the extraction of rubber therefrom to the action of a nitrogenous base which will prevent the deterioration of the rubber in the plants.

5. The method of treating guayule or other rubber-bearing plants, etc., which comprises subjecting the same after harvesting and before treatment for the extraction of rubber therefrom to the action of a water solution of a stabilizing agent which will be absorbed from the water solution by the rubber and prevent deterioration of the same.

6. The method of treating guayule or other rubber-bearing plants, etc., which comprises subjecting the same after harvesting and before treatment for the extraction of rubber therefrom to the action of an organic amine.

7. The method of treating guayule or other rubber-bearing plants, etc., which comprises subjecting the same after harvesting and before treatment for the extraction of rubber therefrom to the action of an aromatic diamine.

8. The method of treating guayule or other rubber-bearing plants, etc., which comprises subjecting the same after harvesting and before treatment for the extraction of rubber therefrom to the action of dimethyl-para-phenylenediamine.

9. The process according to claim 1 in which the treated plants, after treatment with a solution of stabilizing agent, are drained or dried to a regulated moisture content and stored under conditions of regulated humidity.

10. The process according to claim 1 in which the treated plants are stored in their stabilized condition for prolonged periods of time before the extraction of the rubber therefrom.

11. The method of treating guayule plants which comprises crushing the plants and storing the crushed plants in a crushed form, the crushed plants being treated before storage with a small amount of a stabilizing agent to preserve the rubber.

12. The process according to claim 1 in which the treated and crushed plants are formed into bales for storage or shipment.

13. Guayule or other rubber-bearing plants treated after harvestitng and before extraction of rubber therefrom with a stabilizing agent which prevents deterioration of the rubber in the plants.

14. Guayule or other rubber-bearing plants treated after harvesting and before extraction of rubber therefrom with an organic stabilizing agent which is absorbed by and stabilizes the rubber in the plants.

15. Guayule or other rubber-bearing plants treating after harvesting and before extraction of rubber therefrom with a nitrogenous organic stabilizing agent which is absorbed by and stabilizes the rubber of the plants.

16. Guayule or other rubber-bearing plants treated after harvesting and before extraction of rubber therefrom with a nitrogenous organic base which is absorbed by and stabilizes the rubber in the plants.

17. Guayule or other rubber-bearing plants treated after harvesting and before extraction of rubber therefrom with an aromatic diamine.

18. Guayule or other rubber-bearing plants treated after harvesting and before extraction of rubber therefrom with dimethyl-para-phenylenediamine.

19. Guayule or other rubber-bearing plants as defined in claim 13 in the form of bales suitable for storage or shipment.

20. Guayule or other rubber-bearing plants as defined in claim 13 which is ground or crushed and suitable for storage before extraction of the rubber therefrom.

21. Guayule or other rubber-bearing plants as defined in claim 13 which are preserved after treatment with a regulated moisture content.

In testimony whereof I affix my signature.

DAVID SPENCE.